United States Patent
Parlini

(10) Patent No.: US 7,299,113 B2
(45) Date of Patent: Nov. 20, 2007

(54) SYSTEM AND METHOD FOR DETERMINING AIRCRAFT TAPELINE ALTITUDE

(75) Inventor: Flash Parlini, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 666 days.

(21) Appl. No.: 10/758,405

(22) Filed: Jan. 15, 2004

(65) Prior Publication Data

US 2005/0159857 A1    Jul. 21, 2005

(51) Int. Cl.
*G01S 13/66*    (2006.01)

(52) U.S. Cl. .......................................... 701/4; 73/384

(58) Field of Classification Search ................ 701/3, 701/4, 7, 10; 73/384; 340/945, 967, 969, 340/970; 342/357.11, 120, 357.12
See application file for complete search history.

(56) References Cited

U.S. PATENT DOCUMENTS

| | | | | |
|---|---|---|---|---|
| 2,841,345 | A | * | 7/1958 | Halpert et al. ............... 244/187 |
| 3,012,180 | A | * | 12/1961 | Finvold ....................... 318/457 |
| 4,750,127 | A | * | 6/1988 | Leslie et al. .................. 701/16 |
| 4,924,401 | A | | 5/1990 | Bice et al. |
| 6,216,064 | B1 | | 4/2001 | Johnson et al. |
| 6,246,960 | B1 | * | 6/2001 | Lin ............................. 701/214 |
| 6,259,380 | B1 | * | 7/2001 | Jensen ........................ 340/970 |
| 6,462,703 | B2 | * | 10/2002 | Hedrick ....................... 342/120 |
| 6,522,298 | B1 | | 2/2003 | Burgett et al. |
| 6,552,681 | B1 | * | 4/2003 | Hayward et al. ...... 342/357.06 |
| 6,584,384 | B2 | | 6/2003 | Gremmert et al. |
| 2002/0116126 | A1 | * | 8/2002 | Lin ............................. 701/214 |

FOREIGN PATENT DOCUMENTS

EP    0 606 890 A1    7/1994

* cited by examiner

*Primary Examiner*—Dalena Tran
(74) *Attorney, Agent, or Firm*—Lee & Hayes, PLLC

(57) ABSTRACT

A method, apparatus, and computer program product for accurately determining aircraft altitude, impact pressure, and calibrated air speed are provided. The determined results may be used for analysis in certification processes, used for building flight testing or simulation models that also may used in certification processes, or used for other purposes such as data to be used in a flight simulator. Altitude information of an aircraft is determined based on recorded altitude information generated by an inertial navigation system (INS) of the aircraft and altitude information generated by a global positioning system (GPS) of the aircraft. A static pressure value is generated based on the determined altitude information.

36 Claims, 4 Drawing Sheets

SYSTEM AND METHOD FOR DETERMINING AIRCRAFT TAPELINE ALTITUDE

FIELD OF THE INVENTION

This invention relates generally to aircraft, and, more specifically, to determining aircraft altitude.

BACKGROUND OF THE INVENTION

For aircraft certification and modeling for simulation, the actual height of the aircraft during flight must be determined accurately within a threshold value typically of a few feet. This is required in order to pass various certifications. One method for calculating aircraft height uses a barometric loop (baro loop) of inertial reference sensor data. However, the baro loop produces some errors that reduce the accuracy when determining actual aircraft altitude.

Other current methods use height derived from inertial vertical speed with corrections for ambient pressure and temperature. However, these methods may not have desired accuracy for these applications. This is due to designs of aircraft inertial systems, which bias their vertical calculations with pressure inputs from the aircraft's sensors.

Therefore, there exists an unmet need to more accurately determine aircraft height for post-flight testing and aircraft modeling.

SUMMARY OF THE INVENTION

Embodiments of the present invention provide a method, apparatus, and computer program product for accurately determining aircraft altitude, impact pressure, and calibrated air speed. The determined results may be used for analysis in certification processes, used for building flight testing or simulation models that also may used in certification processes, or used for other purposes such as data to be used in a flight simulator.

According to an embodiment of the present invention, altitude information of an aircraft is determined based on recorded altitude information generated by an inertial navigation system (INS) of the aircraft and altitude information generated by a global positioning system (GPS) of the aircraft. A static pressure value is generated based on the determined altitude information.

In one aspect of the invention, the altitude information is adjusted based on known aircraft position defined by a system other than the INS and the GPS.

In another aspect of the invention, an integration is performed of a temperature adjusted vertical velocity value produced by the INS or a double integration is performed of a vertical acceleration value produced by the INS, and the result of either integration is adjusted according to aircraft pitch, roll, and yaw. A least squares fit is performed between the INS altitude information and the GPS altitude information.

In still another aspect of the invention, impact pressure is generated based on the generated static pressure and previously recorded pressure information from a pitot static system of the aircraft. Calibrated airspeed is generated based on the generated impact pressure and aircraft performance data or a simulation model is built based on the calibrated airspeed

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
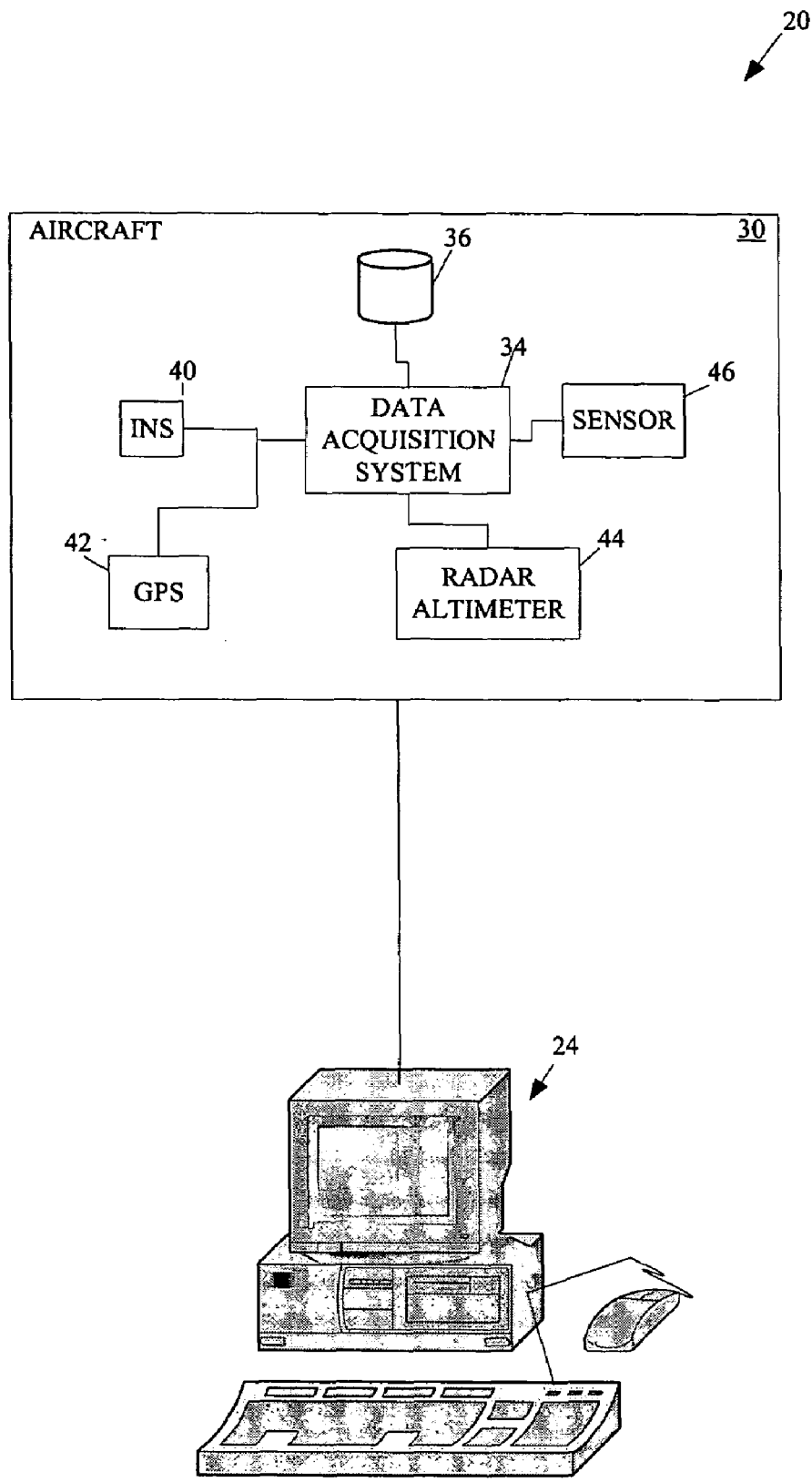
FIG. 1 is a block diagram of an exemplary system for performing aircraft height determination.

Embodiments of the present invention provide a system and method for accurately determining aircraft altitude for use in a simulation model for testing various aspects of an aircraft relative to an actual flight test. Referring now to FIG. 1, a system 20 is illustrated for generating aircraft altitude information in accordance with the present invention. The system 20 includes a computer 24 that receives data obtained by components of an aircraft 30. The aircraft 30 includes a data acquisition system 34 that stores data in a memory 36. The stored data is received from an Inertial Navigation System (INS) 40, a Global Position System (GPS) 42, a Radar Altimeter (RADAlt) 44, and various aircraft sensors 46, such as without limitation a pitot static system, and aircraft pitch, roll, and yaw sensors. After the aircraft 30 has completed a designated test, the computer 24 retrieves the data stored in the memory 36. The computer 24 retrieves the data from the memory 36 by a direct connection or a wireless connection. In another embodiment, the memory 36 includes a removable memory device that includes the stored data. The computer 24 receives the memory device in a receiving port.

The computer 24 is a general purpose computer, such as without limitation a personal computer, a laptop, a mainframe, or a hand-held computer. The computer 24 includes memory, a processor, various user interfaces, such as without limitation a keyboard, a mouse, and a display. The computer 24 determines aircraft altitude or pressure that the aircraft 30 is experiencing at various points in time during a test scenario according to an exemplary process described in more detail below with respect to FIGS. 2 and 3.

Figure 2:
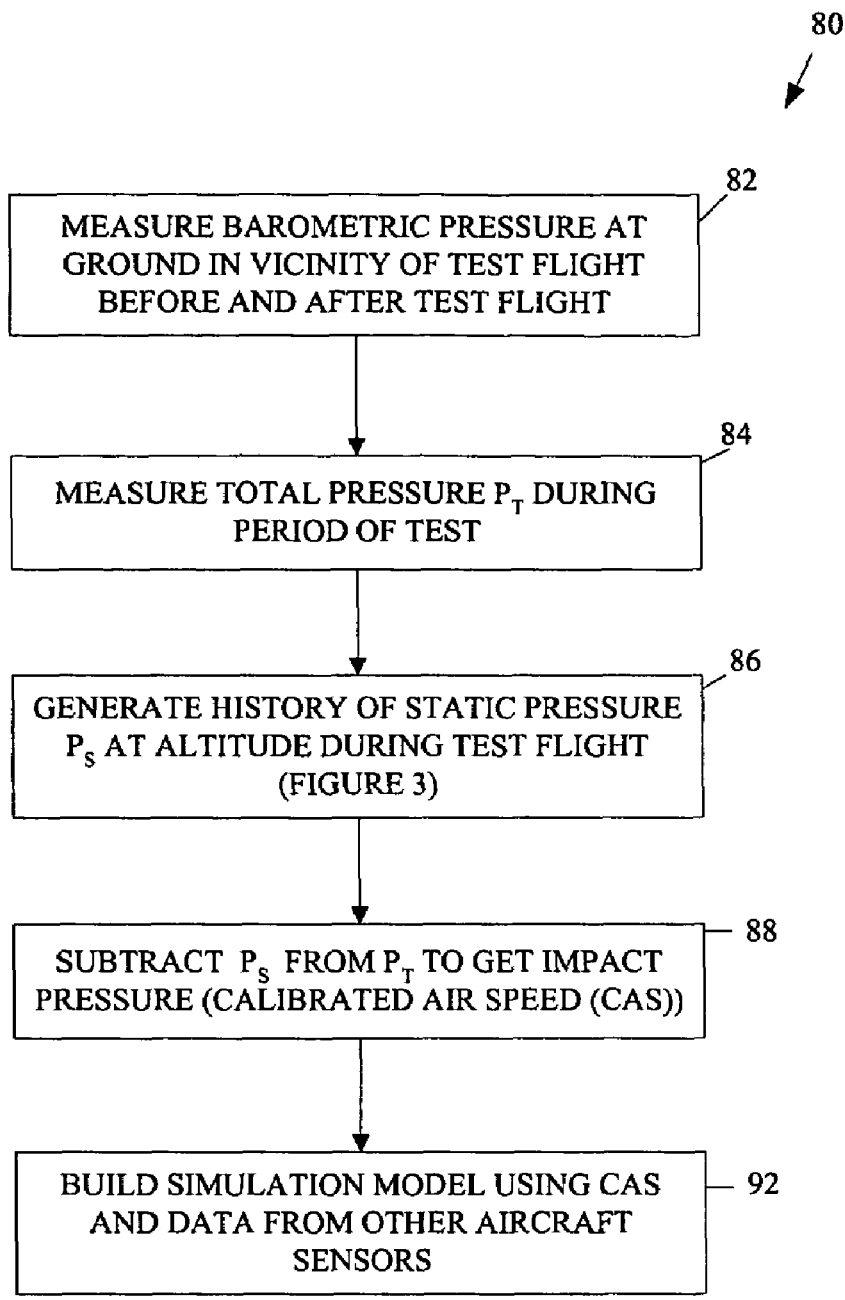
FIGS. 2 and 3 are flow diagrams of an exemplary process performed by the system shown in FIG. 1.

Referring now to FIG. 2, an exemplary process 80 is illustrated for generating highly accurate aircraft altitude information, pressure information, and calibrated airspeed (CAS) for use in post-flight test analysis. The process 80 begins at a block 82 where barometric pressure is measured at the ground in the vicinity of where the flight test is taking place. The barometric pressure measurement is performed shortly before or soon after the flight test, or both. This measurement is taken in order to get an accurate measurement of barometric pressure throughout the period of the flight test. At a block 84, during the test flight, the total pressure is measured by the aircraft 30 at a pre-defined sampling rate. Total pressure $P_T$ is measured by the aircraft's pitot system. At a block 86, a history of static pressure values at altitude during the test flight are suitably generated after the test flight has occurred. Generation of a history of static pressure values is described in more detail below with regards to FIG. 3. At a block 88, for each sample period of time the static pressure $P_S$ is subtracted from the total pressure $P_T$ in order to get impact pressure. In one embodiment, CAS is determined from the impact pressure using Bernoulli's equation. At a block 92, a simulation model is built using the CAS and data from other aircraft sensors 46.

Figure 3:
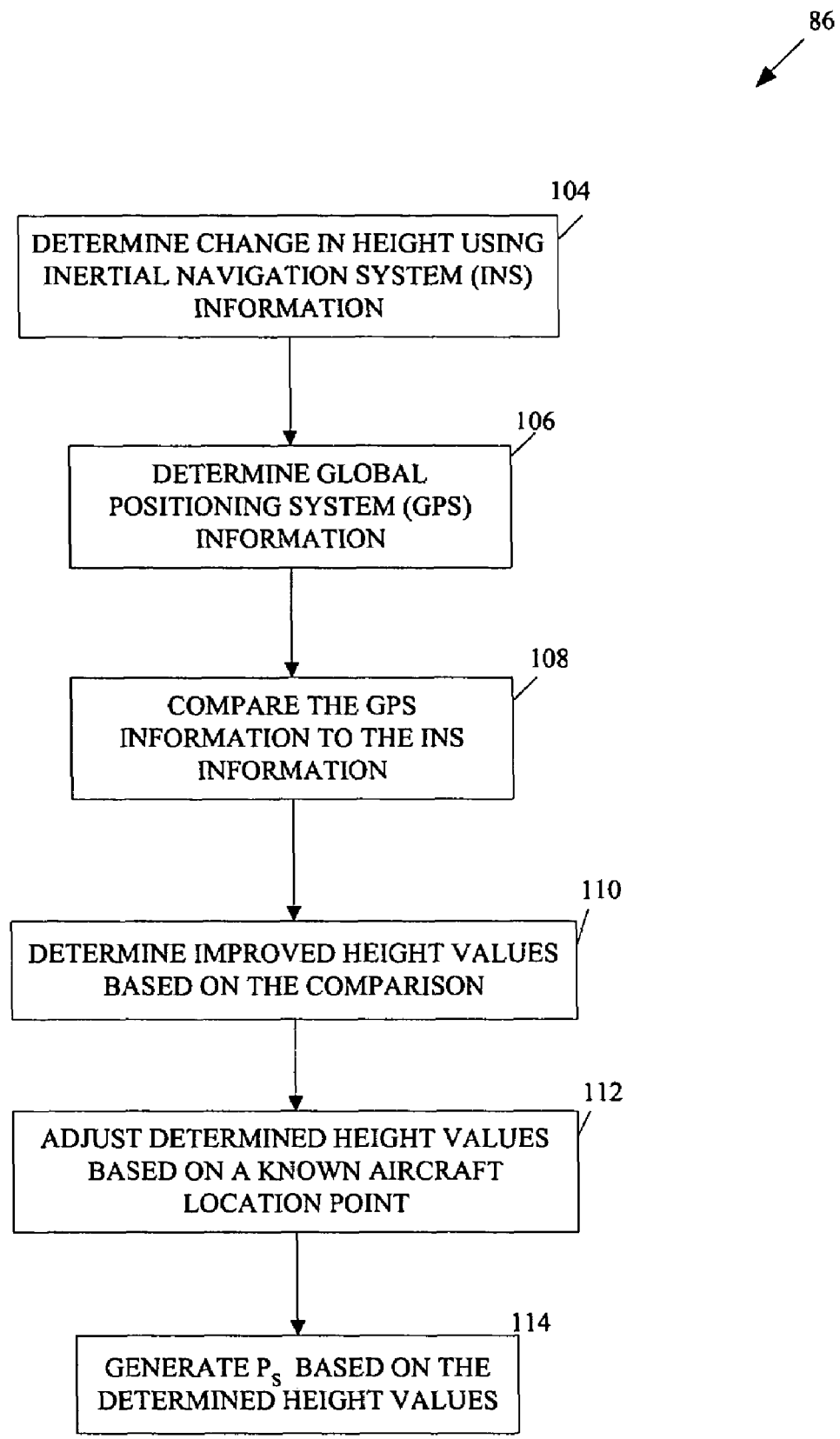

Referring now to FIG. 3, generation of static pressure values $P_S$ is shown as performed at the block 86 in FIG. 2. The exemplary process 86 begins at a block 104 wherein the computer 24 determines change in height values (Δh) using INS information. The change in height Δh is determined by double integrating an INS vertical acceleration value or taking a single integration of a temperature adjusted INS vertical velocity value. Equation 1 below is an example equation for generating the temperature adjusted INS vertical velocity value.

$$VZIC = \frac{VZI * 504.7446 * TAMB}{[145442.2 - HP]} \quad (1)$$

where:
VZI is raw inertial vertical speed in ft/sec;
HP is pressure altitude in feet;
TAMB is ambient air temperature in deg. K; and
VZIC is vertical speed from the INS 40 that has been corrected to give tapeline vertical velocity.

At a block 106, GPS altitude information along a test flight is determined. At a block 108, the GPS information is compared to the INS information during an appropriate test period. At a block 110, improved height values of the aircraft 30 are determined based on the comparison. At a block 112, the determined improved height values are adjusted based on a known aircraft location point. At a block 114, static pressure $P_S$ is generated based on the determined height values.

The following calculations are suitably performed to correct INS height data (i.e., generating improved height values of the aircraft 30). A relatively stable period of flight is selected for generating the improved height values. Equations 2 and 3 below are two different methods for calculating an INS Δh according to aircraft position.

DZ2=(trapezoidal) integration of *VZIC* from [fit time start] to [now]−sin(YAW)*cos(PITCH)*DX−(sin(YAW)*sin(ROLL)*sin(PITCH)+cos(YAW)*cos(ROLL))*DY+(sin(YAW)*cos(ROLL)*sin(PITCH)−cos(YAW)*sin(ROLL))*DZ  (2)

DZ3=second order (trapezoidal) integration of *AZ* from [fit time start] to [now]−sin(YAW)*cos(PITCH)*DX−(sin(YAW)*sin(ROLL)*sin(PITCH)+cos(YAW)*cos(ROLL))*DY+(sin(YAW)*cos(ROLL)*sin(PITCH)−cos(YAW)*sin(ROLL))*DZ  (3)

One method for comparing the GPS information to the INS information is shown in Equations 4 and 5.

DZI=ZPDGPS−DZ2  (4)

or

DZI=ZPDGPS−DZ3  (5)

where:
DX, DY, and DZ are the distances between the inertial sensor and the vehicle reference points in an appropriate body axes system;
AZ is vertical acceleration (from the INS 40);
PITCH, ROLL, and YAW are Euler attitude angles of the aircraft 30; and
ZPDGPS is the height given by the differential GPS (DGPS) system 42, corrected for pitch, roll, and yaw to a reference point.

A second order least squares fit of DZI versus time is calculated:

DZIFIT=C0Z+C1Z*TFIT+C2Z*TFIT*TFIT where:
TFIT is time.

In one embodiment, a second order least squares fit equation is used if 4 or more DGPS points are available, a first order fit equation is used if 3 points are available, and a zero order fit equation is used otherwise. If no DGPS data exists, then C0Z=C1Z=C2Z=0.

T=[time now]−[start time of inertial vertical fit]

ZPINTU=DZ2+C0Z+C1Z*T+C2Z*T*T or

ZPINTU=DZ3+C0Z+C1Z*T+C2Z*T*T where:
T is a running time used in the correction; it can extend beyond either or both ends of the fit time period; and
ZPINTU is the unsynchronized height change produced by this method from the INS 40 data.

A point (in time) for synchronizing to a reference height is identified. In this embodiment, the reference height is known terrain, where radar altimeter data is used.

A synchronization constant at time T1 is calculated:

DZ1=ZPREF1−ZPINTU

Then, for all times of interest:

ZPINT1=ZPINTU+DZ1 where:
T1 is the time of synchronization, T1 is used only to identify the point for the above equation above;
ZPREF1 is the reference height at time T1, obtained by various means, such as without limitation from GPS information, corrected radar altimeter data, laser altimeter data, stable ground location, position fix with an known object (visual or photographic); and
ZPINT1 is the DGPS-corrected inertial sensor height of the aircraft 30.

This synchronization can be repeated for different segments of time in a flight test. These segments, along with time segments of height data computed by other means, can be combined to give a history of aircraft height for the duration of the test period.

Static pressure $P_S$ is determined according to Equation 6:

$$\frac{d(P_S)}{dZ} = \frac{-P_S * (0.010413)}{TAMB} \quad (6)$$

where:
Z is the height determined above. Z is the tapeline altitude.

Figure 4:
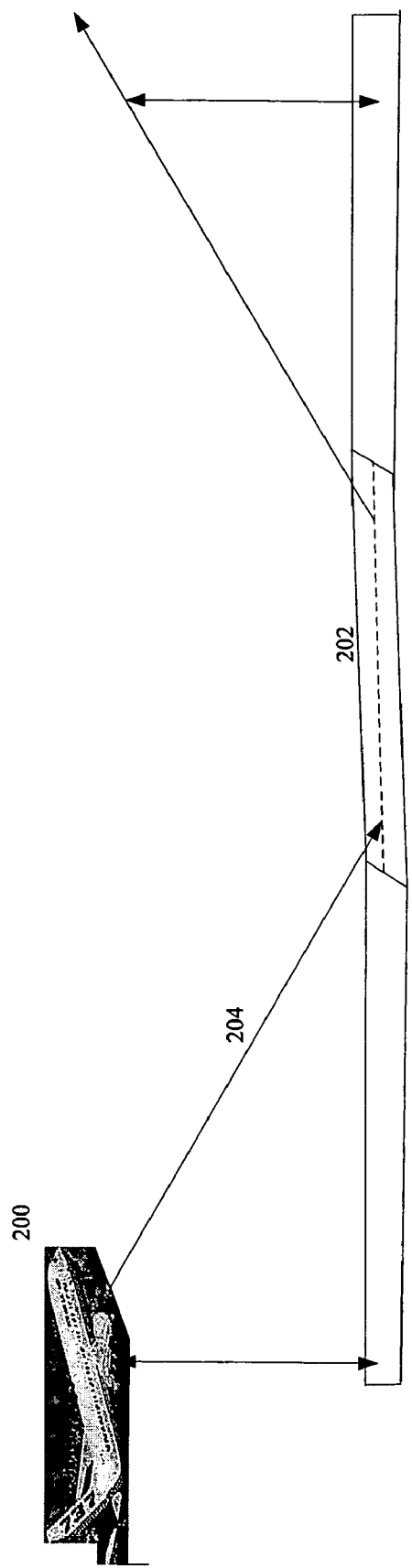
FIG. 4 is a perspective view of an aircraft performing a test flight.

Referring now to FIG. 4, a perspective view of an aircraft 200 on approach to landing on a runway 202 is shown. This is an example test flight that may be analyzed by embodiments of the present invention in order to produce accurate altitude values in a post-test analysis of the aircraft 200 after having flown a flight path 204 to touchdown on the runway 202. A calculation of the height data performed by the process of the block 86 (FIG. 3) is performed twice. The first time is at the block 108 (FIG. 3) when the GPS information is compared to the INS information. The initial starting location of the INS information is irrelevant to actual aircraft height, so therefore it is adjusted to the start point of the GPS information. The second adjustment occurs at the block 112 (FIG. 3), where a known aircraft location point is used to further adjust the height values that are determined in the block 110 (FIG. 3). FIG. 4 illustrates one example for determining a known aircraft location point. In the test flight shown, the aircraft 200 is at some threshold distance from the runway 202 (not to be confused with the runway threshold) where the ground under the flight test profile (i.e., flight path 204) has been mapped so that its true surface height is known. The computer 24 (FIG. 1) uses stored radar altimeter information at the threshold point to determine the height of the aircraft 200 at the threshold point. The determined height information at the threshold point is used in the second adjustment. This process may be likewise performed for a takeoff from the runway 202.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method comprising:
   receiving previously recorded altitude information generated by an inertial navigation system (INS) of an aircraft and altitude information generated by a global positioning system (GPS) of the aircraft; and
   determining altitude information of the aircraft based on the received altitude information generated by the INS of the aircraft and altitude information generated by the GPS of the aircraft, wherein determining altitude information includes performing a curve fit between the INS altitude information and the GPS altitude information.

2. The method of claim 1, further comprising generating a static pressure value based on the determined altitude information.

3. The method of claim 1, wherein the altitude information generated by the GPS includes differentially corrected altitude information.

4. The method of claim 1, wherein determining includes:
   adjusting the altitude information based on known aircraft position defined by a system other than the INS and the GPS.

5. The method of claim 1, wherein determining includes:
   performing an integration of a temperature adjusted vertical velocity value produced by the INS; and
   adjusting the result of the integration according to aircraft pitch, roll, and yaw.

6. The method of claim 1, wherein
   performing a curve fit between the INS altitude information and the GPS altitude information includes:
      if four or more differential GPS points are available, using a second order least squares fit equation.

7. The method of claim 6, wherein performing the curve fit includes:
   if three differential GPS points are available, using a first order fit equation, and
   if less than three differential GPS points are available, using a zero order fit equation.

8. The method of claim 1, wherein determining includes:
   performing a double integration of a vertical acceleration value produced by the INS; and
   adjusting the result of the double integration according to aircraft pitch, roll, and yaw.

9. The method of claim 1, wherein performing the curve fit includes:
   performing a least squares fit between the INS altitude information and the GPS altitude information.

10. The method of claim 1, further comprising:
    generating impact pressure based on the generated static pressure and previously recorded pressure information from a pitot system of the aircraft.

11. The method of claim 10, further comprising:
    generating calibrated airspeed based on the generated impact pressure; and
    performing at least one of building a simulation model based on the calibrated airspeed and determining aircraft performance data based on the calibrated airspeed and altitude.

12. The method of claim 11, wherein building a simulation model is further based on previously recorded data from one or more sensors of the aircraft.

13. One or more computer readable media containing computer readable instructions that, when executed, perform a method comprising:
    receiving previously recorded altitude information generated by an inertial navigation system (INS) of an aircraft and altitude information generated by a global positioning system (GPS) of the aircraft; and
       determining altitude information of the aircraft based on the received altitude information generated by the INS of the aircraft and altitude information generated by the GPS of the aircraft, wherein determining includes performing a curve fit between the INS altitude information and the GPS altitude information.

14. The one or more computer readable media of claim 13, wherein the method further comprises generating a static pressure value based on the determined altitude information.

15. The one or more computer readable media of claim 13, wherein the altitude information generated by the GPS includes differentially corrected altitude information.

16. The one or more computer readable media of claim 13, wherein the method further comprises adjusting the altitude information based on known aircraft position defined by a system other than the INS and the GPS.

17. The one or more computer readable media of claim 13, wherein the method further comprises performing an integration of a temperature adjusted vertical velocity value produced by the INS and adjust the result of the integration according to aircraft pitch, roll, and yaw.

18. The one or more computer readable media of claim 13, wherein performing curve fit between the INS altitude information and the GPS altitude information includes:
    if four or more differential GPS points are available, using a second order least squares fit equation.

19. The one or more computer readable media of claim 18, wherein performing the curve fit includes:
    if three differential GPS points are available, using a first order fit equation, and
    if less than three differential GPS points are available, using a zero order fit equation.

20. The one or more computer readable media of claim 13, wherein determining includes performing a double integration of a vertical acceleration value produced by the INS and adjusting the result of the double integration according to aircraft pitch, roll, and yaw.

21. The one or more computer readable media of claim 13, wherein the curve fit is a least squares fit between the INS altitude information and the GPS altitude information.

22. The one or more computer readable media of claim 13, wherein the method further comprises generating impact pressure based on the generated static pressure and at least one of previously recorded pressure information from a pitot system of the aircraft or recorded true airspeed of the aircraft.

23. The one or more computer readable media of claim 22, wherein the method further comprises:
generating calibrated airspeed based on the generated impact pressure; and
building at least one of the simulation model and aircraft performance data based on the calibrated airspeed and previously recorded aircraft performance data from other sensors of the aircraft.

24. The one or more computer readable media of claim 23, wherein building includes building at least one of the simulator model and aircraft performance data based on previously recorded data from one or more sensors of the aircraft.

25. An apparatus comprising:
memory for storing recorded altitude information generated by an inertial navigation system (INS) of the aircraft and altitude information generated by a global positioning system (GPS) of the aircraft;
one or more user interface devices; and
a processor coupled to the memory and the one or more user interface devices, the processor including:
a first component configured to determine altitude information of the aircraft based on the received altitude information generated by the INS of the aircraft and altitude information generated by the GPS of the aircraft, wherein determining includes performing a curve fit between the INS altitude information and the GPS altitude information.

26. The apparatus of claim 25, wherein the processor further includes a second component configured to generate a static pressure value based on the determined altitude information.

27. The apparatus of claim 25, wherein the altitude information generated by the GPS includes differentially corrected altitude information.

28. The apparatus of claim 25, wherein the first component is configured to adjust the altitude information based on known aircraft position defined by a system other than the INS and the GPS.

29. The apparatus of claim 25, wherein the first component is configured to perform an integration of a temperature adjusted vertical velocity value produced by the INS and adjust the result of the integration according to aircraft pitch, roll, and yaw.

30. The apparatus of claim 25, wherein performing a curve fit between the INS altitude information and the GPS altitude information includes: if four or more differential GPS points are available, using a second order least squares fit equation.

31. The apparatus of claim 30, wherein performing the curve fit includes:
if three differential GPS points are available, using a first order fit equation, and
if less than three differential GPS points are available, using a zero order fit equation.

32. The apparatus of claim 25, wherein the first component is configured to perform a double integration of a vertical acceleration value produced by the INS and adjust the result of the double integration according to aircraft pitch, roll, and yaw.

33. The apparatus of claim 25, wherein the curve fit is a least squares fit between the INS altitude information and the GPS altitude information.

34. The apparatus of claim 27, further comprising:
a third component configured to generate impact pressure based on the generated static pressure and previously recorded pressure information from a pitot static system of the aircraft.

35. The apparatus of claim 34, further comprising:
a fourth component configured to generate calibrated airspeed based on the generated impact pressure; and
a fifth component configured to build at least one of the simulation model and aircraft performance data based on the calibrated airspeed and previously recorded data from other sensors of the aircraft.

36. The apparatus of claim 35, wherein the fifth component is further configured to build at least one of the simulator model and aircraft performance data based on previously recorded data from one or more sensors of the aircraft.

* * * * *